United States Patent
Tang et al.

(10) Patent No.: US 7,948,692 B2
(45) Date of Patent: May 24, 2011

(54) PHOTOGRAPHING OPTICAL LENS ASSEMBLY

(75) Inventors: Hsiang-Chi Tang, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 99 days.

(21) Appl. No.: 12/436,364

(22) Filed: May 6, 2009

(65) Prior Publication Data

US 2010/0202065 A1    Aug. 12, 2010

(30) Foreign Application Priority Data

Feb. 9, 2009   (TW) .................................. 98104091

(51) Int. Cl.
*G02B 9/12* (2006.01)
*G02B 3/02* (2006.01)
(52) U.S. Cl. ........................................ 359/784; 359/716
(58) Field of Classification Search .................. 359/716, 359/784, 789
See application file for complete search history.

(56) References Cited

U.S. PATENT DOCUMENTS

| 7,436,603 B2 | 10/2008 | Huang et al. |
| 7,436,604 B1 | 10/2008 | Tang |
| 7,599,131 B2 * | 10/2009 | Taniyama ..................... 359/784 |

* cited by examiner

*Primary Examiner* — Jack Dinh
(74) *Attorney, Agent, or Firm* — Tim Tingkang Xia; Morris, Manning & Martin, LLP

(57) ABSTRACT

This invention provides a photographing optical lens assembly including, in order from an object side to an image side: a first lens element with positive refractive power; a second lens element with negative refractive power having a concave object-side surface and a convex image-side surface, the object-side and image-side surfaces thereof being aspheric; and a third lens element with negative refractive power having a concave object-side surface, a concave image-side surface and at least one inflection point formed on the third lens element, the object-side and image-side surfaces thereof being aspheric. The first lens element may be a bi-convex lens element or a convex-concave meniscus lens element. When the first lens element is a bi-convex lens element, the refractive power thereof may be significantly enhanced to shorten the total track length of the optical system. When the first lens element is a meniscus lens element, the astigmatism of the optical system may be better corrected. Such an arrangement of optical elements can effectively correct the aberrations of the optical system, improving image quality and enabling the optical lens assembly to maintain a compact form.

31 Claims, 19 Drawing Sheets

TABLE 1

(Embodiment 1)

f = 3.58 mm, Fno = 3.43, HFOV = 31.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.070 | | | | |
| 2 | Lens 1 | 1.25902 (ASP) | 0.575 | Plastic | 1.544 | 55.9 | 2.24 |
| 3 | | -31.13620 (ASP) | 0.356 | | | | |
| 4 | Lens 2 | -0.94197 (ASP) | 0.372 | Plastic | 1.632 | 23.4 | -9.04 |
| 5 | | -1.30053 (ASP) | 0.639 | | | | |
| 6 | Lens 3 | -34.45650 (ASP) | 1.024 | Plastic | 1.530 | 55.8 | -6.78 |
| 7 | | 4.05090 (ASP) | 0.300 | | | | |
| 8 | IR-filter | Plano | 0.300 | Glass | 1.517 | 64.2 | - |
| 9 | | Plano | 0.447 | | | | |
| 10 | Image | Plano | | | | | |

Fig. 9

TABLE 2

| | Aspheric Coefficients | | | | | |
|---|---|---|---|---|---|---|
| Surface # | 2 | 3 | 4 | 5 | 6 | 7 |
| k = | 7.83086E-01 | -1.00000E+00 | 2.42258E-01 | -1.20227E+00 | 3.76022E+02 | -1.00000E+00 |
| A4 = | -8.26585E-02 | -1.69078E-01 | 1.04328E-01 | 1.20359E-01 | -9.94449E-02 | -8.98110E-02 |
| A6 = | -1.61640E-01 | -2.48682E-01 | 9.68957E-01 | 4.05797E-01 | 2.34863E-02 | 2.40298E-02 |
| A8 = | 5.83808E-02 | -5.22862E-01 | -3.07506E+00 | -4.40490E-02 | -1.81241E-03 | -9.56999E-03 |
| A10= | 6.15315E-01 | 1.92717E+00 | 8.28727E+00 | 1.31078E-01 | -6.74439E-03 | 1.86569E-03 |
| A12= | -7.17435E+00 | -4.38973E+00 | -1.11390E+01 | -2.41037E-02 | -4.19955E-03 | -2.64870E-04 |
| A14= | 1.26577E+01 | 1.53158E+00 | 6.06942E+00 | -6.23694E-02 | -6.74288E-04 | 3.24927E-06 |
| A16= | -8.06203E+00 | -1.48113E+00 | -6.93687E+00 | -1.70269E-01 | 2.47918E-03 | 4.28722E-07 |

Fig. 10

TABLE 3

(Embodiment2)

f = 3.65 mm, Fno = 2.84, HFOV = 31.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.074 | | | | |
| 2 | Lens 1 | 1.61619 (ASP) | 0.747 | Plastic | 1.544 | 55.9 | 1.86 |
| 3 | | -2.25885 (ASP) | 0.285 | | | | |
| 4 | Lens 2 | -0.91520 (ASP) | 0.599 | Plastic | 1.632 | 23.4 | -6.01 |
| 5 | | -1.51110 (ASP) | 0.565 | | | | |
| 6 | Lens 3 | -20.00000 (ASP) | 0.900 | Plastic | 1.544 | 55.9 | -4.57 |
| 7 | | 2.88175 (ASP) | 0.300 | | | | |
| 8 | IR-filter | Plano | 0.300 | Glass | 1.517 | 64.2 | - |
| 9 | | Plano | 0.510 | | | | |
| 10 | Image | Plano | | | | | |

Fig. 11

TABLE 4

Aspheric Coefficients

| Surface # | 2 | 3 | 4 | 5 | 6 | 7 |
|---|---|---|---|---|---|---|
| k = | 4.73888E-01 | 2.91874E+00 | 4.62812E-03 | 5.18601E-01 | -2.93089E+01 | -1.97529E+01 |
| A4 = | -1.06052E-01 | -2.22025E-01 | -1.73448E-02 | 8.57180E-02 | -2.59865E-01 | -1.03068E-01 |
| A6 = | 2.14642E-02 | -1.37709E-02 | 1.18217E+00 | 3.82325E-01 | 1.89927E-01 | 3.63764E-02 |
| A8 = | -7.32016E-01 | -5.25235E-01 | -2.92510E+00 | -1.45838E-01 | -2.01621E-01 | -1.21517E-02 |
| A10= | 1.10860E+00 | 2.05672E+00 | 7.85868E+00 | -1.05404E-02 | 1.31621E-01 | 4.89281E-04 |
| A12= | -4.64855E+00 | -3.91549E+00 | -1.19625E+01 | -5.92487E-04 | -2.71848E-02 | 4.17255E-06 |
| A14= | 1.40235E+01 | 3.36196E+00 | 8.71096E+00 | 3.60420E-01 | -8.93804E-02 | 1.04004E-04 |
| A16= | -1.83545E+01 | -1.42188E+00 | -1.64811E+00 | -3.06706E-01 | 4.90063E-02 | -2.84326E-05 |

Fig. 12

TABLE 5

(Embodiment3)

f = 3.50 mm, Fno = 2.45, HFOV = 32.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.190 | | | | |
| 2 | Lens 1 | 1.26194 (ASP) | 0.701 | Plastic | 1.544 | 55.9 | 2.2 |
| 3 | | -18.76400 (ASP) | 0.275 | | | | |
| 4 | Lens 2 | -1.02007 (ASP) | 0.325 | Plastic | 1.632 | 23.4 | -10.72 |
| 5 | | -1.34907 (ASP) | 0.554 | | | | |
| 6 | Lens 3 | -9.45130 (ASP) | 1.001 | Plastic | 1.544 | 55.9 | -5.49 |
| 7 | | 4.53590 (ASP) | 0.300 | | | | |
| 8 | IR-filter | Plano | 0.300 | Glass | 1.517 | 64.2 | - |
| 9 | | Plano | 0.459 | | | | |
| 10 | Image | Plano | | | | | |

Fig. 13

TABLE 6A

| Aspheric Coefficients | | | | |
|---|---|---|---|---|
| Surface # | 2 | 3 | 4 | 5 |
| k = | 6.99235E-01 | -2.35347E+02 | 9.74782E-02 | -1.14906E-01 |
| A4 = | -8.52424E-02 | -2.07865E-01 | -8.36600E-02 | 9.40635E-02 |
| A6 = | -8.98544E-03 | -1.59432E-01 | 1.30617E+00 | 6.05649E-01 |
| A8 = | -2.61654E-01 | -5.84103E-01 | -2.94297E+00 | 1.23489E-01 |
| A10= | 7.08249E-01 | 2.09005E+00 | 7.86034E+00 | -9.13862E-02 |
| A12= | -6.16310E+00 | -3.57678E+00 | -1.23845E+01 | -1.25573E-01 |
| A14= | 1.56225E+01 | 3.50376E+00 | 8.28429E+00 | 3.97819E-01 |
| A16= | -1.36325E+01 | -1.80952E+00 | -9.28546E-01 | -2.92733E-01 |

Fig. 14A

TABLE 6B

| Aspheric Coefficients | | |
|---|---|---|
| Surface # | 6 | 7 |
| k = | -1.55318E+01 | 1.80620E+00 |
| A1 = | | |
| A2 = | | |
| A3 = | | |
| A4 = | -2.32361E-01 | -1.22948E-01 |
| A5 = | | |
| A6 = | 2.82409E-01 | 3.50395E-02 |
| A7 = | | |
| A8 = | -6.06941E-01 | -1.15506E-02 |
| A9 = | | |
| A10= | 6.30420E-01 | 4.24099E-04 |
| A11= | | |
| A12= | -1.04571E-01 | -2.24676E-04 |
| A13= | | |
| A14= | -3.88421E-01 | 3.12941E-04 |
| A15= | | |
| A16= | 2.26158E-01 | -7.86922E-05 |

Fig. 14B

TABLE 7

(Embodiment4)

f = 3.47 mm, Fno = 2.45, HFOV = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.190 | | | | |
| 2 | Lens 1 | 1.22056 (ASP) | 0.632 | Plastic | 1.544 | 55.9 | 2.28 |
| 3 | | 55.16270 (ASP) | 0.297 | | | | |
| 4 | Lens 2 | -1.04382 (ASP) | 0.320 | Plastic | 1.632 | 23.4 | -12.6 |
| 5 | | -1.34392 (ASP) | 0.592 | | | | |
| 6 | Lens 3 | -21.31020 (ASP) | 0.891 | Plastic | 1.544 | 55.9 | -6.08 |
| 7 | | 3.97560 (ASP) | 0.300 | | | | |
| 8 | IR-filter | Plano | 0.300 | Glass | 1.517 | 64.2 | - |
| 9 | | Plano | 0.513 | | | | |
| 10 | Image | Plano | | | | | |

Fig. 15

TABLE 8A

Aspheric Coefficients

| Surface # | 2 | 3 | 4 | 7 |
|---|---|---|---|---|
| k = | 7.15925E-01 | 5.56967E+01 | 1.63973E-01 | -8.79548E+00 |
| A4 = | -8.47598E-02 | -1.71428E-01 | -9.15324E-02 | -1.26782E-01 |
| A6 = | -2.91407E-02 | -1.59504E-01 | 1.27053E+00 | 4.58486E-02 |
| A8 = | -2.33061E-01 | -6.54752E-01 | -2.91334E+00 | -1.64215E-02 |
| A10= | 7.08196E-01 | 2.01508E+00 | 7.85434E+00 | 3.30918E-04 |
| A12= | -6.25427E+00 | -3.57937E+00 | -1.23268E+01 | 9.56356E-05 |
| A14= | 1.56213E+01 | 3.56459E+00 | 8.19775E+00 | 4.02051E-04 |
| A16= | -1.39070E+01 | -1.82332E+00 | -8.46279E-01 | -1.36835E-04 |

Fig. 16A

TABLE 8B

Aspheric Coefficients

| Surface # | 5 | 6 |
|---|---|---|
| k = | -4.54307E-03 | -1.06319E+00 |
| A1 = | | |
| A2 = | | |
| A3 = | | |
| A4 = | 8.41864E-02 | -2.45203E-01 |
| A5 = | | |
| A6 = | 5.81837E-01 | 2.90571E-01 |
| A7 = | | |
| A8 = | 1.38230E-01 | -6.17597E-01 |
| A9 = | | |
| A10= | 1.45805E-02 | 6.40068E-01 |
| A11= | | |
| A12= | -8.70445E-02 | -9.62596E-02 |
| A13= | | |
| A14= | 3.70536E-01 | -3.88893E-01 |
| A15= | | |
| A16= | -3.16071E-01 | 2.14388E-01 |

Fig. 16B

TABLE 9

|  | Embodiment 1 | Embodiment 2 | Embodiment 3 | Embodiment 4 |
| --- | --- | --- | --- | --- |
| f | 3.58 | 3.65 | 3.50 | 3.47 |
| Fno | 3.43 | 2.84 | 2.45 | 2.45 |
| HFOV | 31.6 | 31.2 | 32.7 | 32.9 |
| V1 | 55.9 | 55.9 | 55.9 | 55.9 |
| V2 | 23.4 | 23.4 | 23.4 | 23.4 |
| CT2 | 0.372 | 0.599 | 0.325 | 0.320 |
| CT2/f | 0.10 | 0.16 | 0.09 | 0.09 |
| CT3/f | 0.29 | 0.25 | 0.29 | 0.26 |
| T12/T23 | 0.56 | 0.50 | 0.50 | 0.50 |
| |R1/R2| | 0.04 | 0.72 | 0.07 | 0.02 |
| R5/R6 | -8.51 | -6.94 | -2.08 | -5.36 |
| f/f1 | 1.60 | 1.96 | 1.59 | 1.52 |
| f/f2 | -0.40 | -0.61 | -0.33 | -0.28 |
| f/f3 | -0.53 | -0.80 | -0.64 | -0.57 |
| TTL/ImgH | 1.78 | 1.87 | 1.70 | 1.66 |

Fig. 17

PHOTOGRAPHING OPTICAL LENS ASSEMBLY

BACKGROUND OF THE INVENTION

1. Field of the Invention

The present invention relates to a photographing optical lens assembly, and more particularly, to a compact photographing optical lens assembly used in a mobile phone camera.

2. Description of the Prior Art

A conventional compact lens assembly for mobile phone cameras, such as the optical lens system for taking image disclosed in U.S. Pat. No. 7,436,604, generally comprises two lens elements. However, with an increasing demand for compact lens assemblies featuring higher resolution and better image quality, the two-lens structure has become insufficient for a more high-end photographing lens assembly. The optical lens system for taking image disclosed in U.S. Pat. No. 7,436,603 provides a three lens element structure, a so-called triplet lens design and comprises, from the object side to the image side: a first lens element with positive refractive power; a second lens element with negative refractive power; and a third lens element with positive refractive power. Though the aforementioned triplet design facilitates the correction of most of the aberrations caused by the optical system, it requires a longer optical track length. Therefore, the total track length of the optical lens system for taking image must also become longer to accommodate the optical track, making it difficult to meet the requirements of a more compact photographing lens assembly.

SUMMARY OF THE INVENTION

The present invention provides a photographing optical lens assembly comprising, in order from the object side to the image side: a first lens element with positive refractive power; a second lens element with negative refractive power having a concave object-side surface and a convex image-side surface, the object-side and image-side surfaces thereof being aspheric; and a third lens element with negative refractive power and at least one inflection point formed thereon having a concave object-side surface and a concave image-side surface, the object-side and image-side surfaces thereof being aspheric. Such an arrangement of optical elements can effectively correct the aberrations of the photographing optical lens assembly, improving image quality and enabling the photographing optical lens assembly to maintain a compact form.

In the present photographing optical lens assembly, the first lens element may be a bi-convex lens element or a meniscus lens element having a convex object-side surface and a concave image-side surface. When the first lens element is a bi-convex lens element, the refractive power thereof may be significantly enhanced, thus allowing a shortening of the total track length of the photographing optical lens assembly. When the first lens element is a meniscus lens element, the astigmatism of the photographing optical lens assembly may be better corrected. In addition, the third lens element has negative refractive power with a concave object-side surface and a concave image-side surface, enabling the principal point of the photographing optical lens assembly to be positioned far away from the image plane, which is favorable for shortening the total track length and maintaining a compact form.

According to one aspect of the present invention, in the present photographing optical lens assembly, the center thickness of the second lens element is CT2, the focal length of the photographing optical lens assembly is f, and they satisfy the relation: $0.03 < CT2/f < 0.16$.

The above relation improves the moldability and homogeneity of the plastic-injection-molded lenses and enables the total track length of the photographing optical lens assembly to be reduced effectively.

According to another aspect of the present invention, in the present photographing optical lens assembly, the Abbe number of the first lens element is V1, and it satisfies the relation: $V1 < 62$.

The above relation facilitates the correction of the astigmatism of the photographing optical lens assembly, so that the image quality of the photographing optical lens assembly can be improved.

According to yet another aspect of the present invention, in the present photographing optical lens assembly, the radius of curvature of the object-side surface of the first lens element is R1, the radius of curvature of the image-side surface of the first lens element is R2, and they satisfy the relation: $0 < |R1/R2| < 0.4$.

The above relation facilitates the correction of the spherical aberration of the photographing optical lens assembly.

BRIEF DESCRIPTION OF THE DRAWINGS

FIG. 9 is TABLE 1 which lists the optical data of the structure of the first embodiment.

FIG. 10 is TABLE 2 which lists the aspheric surface data of the first embodiment.

FIG. 11 is TABLE 3 which lists the optical data of the structure of the second embodiment.

FIG. 12 is TABLE 4 which lists the aspheric surface data of the second embodiment.

FIG. 13 is TABLE 5 which lists the optical data of the structure of the third embodiment.

FIG. 14 is TABLE 6 which lists the aspheric surface data of the third embodiment.

FIG. 15 is TABLE 7 which lists the optical data of the structure of the fourth embodiment.

FIG. 16 is TABLE 8 which lists the aspheric surface data of the fourth embodiment.

FIG. 17 is TABLE 9 which lists the data of the respective embodiments resulted from the equations.

DETAILED DESCRIPTION OF THE PREFERRED EMBODIMENTS

Figure 1:
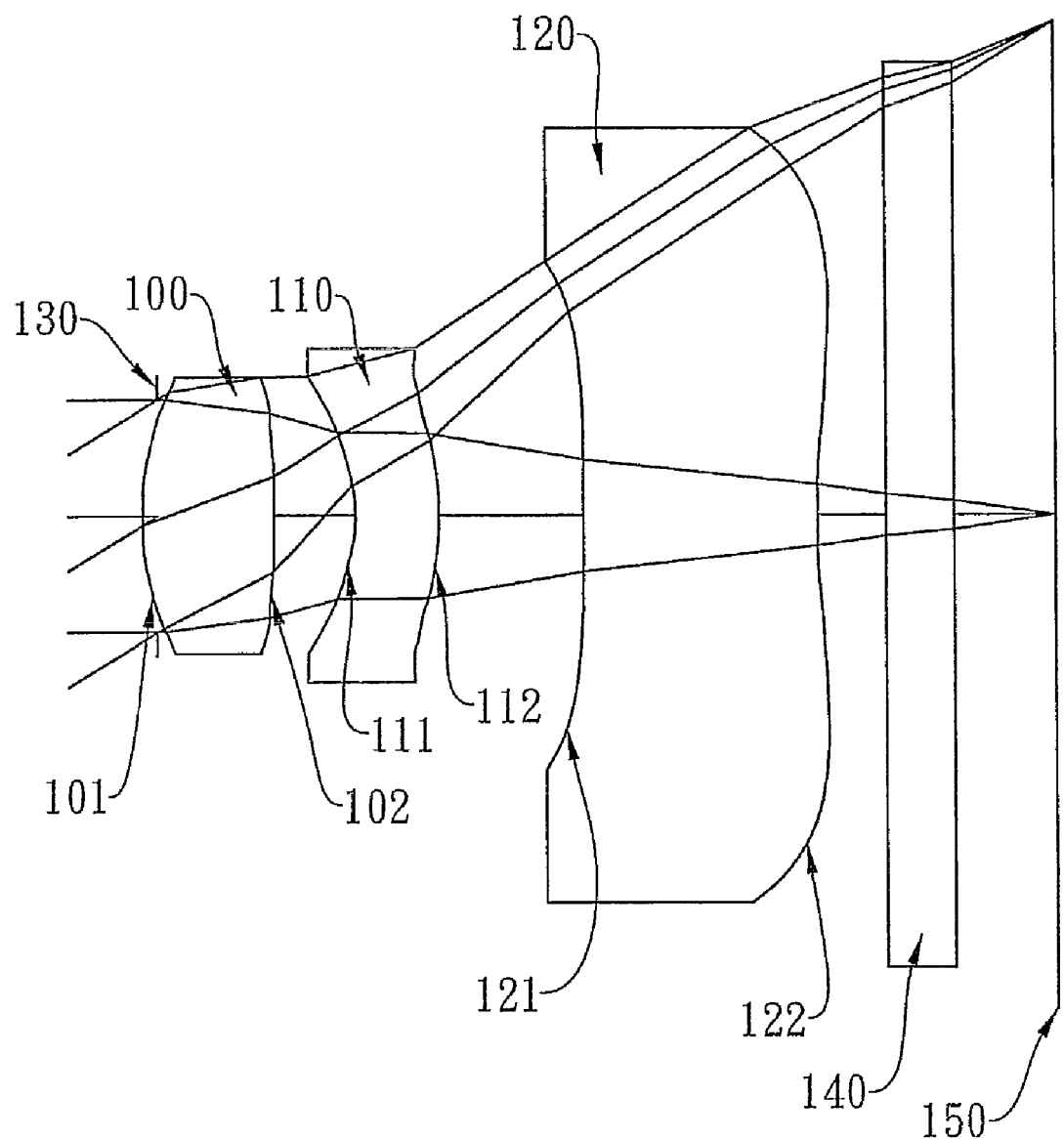
FIG. 1 shows a photographing optical lens assembly in accordance with a first embodiment of the present invention.

A general description of the preferred embodiments of the present invention will now be described. The present invention provides a photographing optical lens assembly comprising, in order from the object side to the image side: a first lens element with positive refractive power; a second lens element with negative refractive power having a concave object-side surface and a convex image-side surface, the object-side and image-side surfaces thereof being aspheric; and a third lens element with negative refractive power and at least one inflection point formed thereon having a concave object-side surface and a concave image-side surface, the object-side and image-side surfaces thereof being aspheric. In the present photographing optical lens assembly, the first lens element may be a bi-convex lens element or a meniscus lens element having a convex object-side surface and a concave image-side surface. When the first lens element is a bi-convex lens element, the refractive power thereof may be significantly enhanced, thus allowing a shortening of the total track length of the photographing optical lens assembly. When the first lens element is a meniscus lens element, the astigmatism of the photographing optical lens assembly can be better corrected. In addition, the third lens element has negative refractive power with a concave object-side surface and a concave image-side surface, enabling the principal point of the photographing optical lens assembly to be positioned far away from the image plane, which is favorable for shortening the total track length and maintaining a compact form.

According to one aspect of the present photographing optical lens assembly, when the first lens element is a bi-convex lens element, the center thickness of the second lens element is CT2, the focal length of the photographing optical lens assembly is f, and they satisfy the relation: $0.03 < CT2/f < 0.16$.

The above relation improves the moldability and homogeneity of the plastic-injection-molded lenses and enables the total track length of the photographing optical lens assembly to be shortened effectively. Preferably, CT2 satisfies the relation: $0.15 \text{ mm} < CT2 < 0.38 \text{ mm}$.

Preferably in the aforementioned photographing optical lens assembly, the lens elements with refractive power are limited to the first lens element, the second lens element and the third lens element.

In the aforementioned photographing optical lens assembly, the focal length of the first lens element is f1, the focal length of the photographing optical lens assembly is f, and they preferably satisfy the relation: $1.30 < f/f1 < 2.00$.

When the above relation is satisfied, the refractive power of the first lens element is more balanced so that the total track length of the photographing optical lens assembly can be effectively controlled to maintain the compact form of the photographing optical lens assembly. The above relation also prevents the high order spherical aberration and coma from becoming too large, so that the image quality can be improved.

Further, it will be preferable that f/f1 satisfies the relation: $1.45 < f/f1 < 1.70$.

In the aforementioned photographing optical lens assembly, the focal length of the second lens element is f2, the focal length of the photographing optical lens assembly is f, and they preferably satisfy the relation: $-0.58 < f/f2 < -0.2$.

The above relation facilitates the correction of the chromatic aberration of the photographing optical lens assembly.

In the aforementioned photographing optical lens assembly, the radius of curvature of the object-side surface of the first lens element is R1, the radius of curvature of the image-side surface of the first lens element is R2, and they preferably satisfy the relation: $0 < |R1/R2| < 0.25$.

The above relation facilitates the correction of the spherical aberration of the photographing optical lens assembly.

In the aforementioned photographing optical lens assembly, the radius of curvature of the object-side surface of the third lens element is R5, the radius of curvature of the image-side surface of the third lens element is R6, and they preferably satisfy the relation: $R5/R6 < -1.5$.

The above relation facilitates the correction of the astigmatism and distortion of the photographing optical lens assembly so that the image quality can be improved.

In the aforementioned photographing optical lens assembly, the center thickness of the third lens element is CT3, and it preferably satisfies the relation: $0.20 < CT3/f < 0.40$.

When the above relation is satisfied, the astigmatism and distortion of the photographing optical lens assembly can be effectively corrected. The above relation also prevents the back focal length from becoming too short so that the rear end of the lens assembly can have sufficient space to accommodate mechanical components.

In the aforementioned photographing optical lens assembly, the on-axis spacing between the first lens element and the second lens element is T12, the on-axis spacing between the second lens element and the third lens element is T23, and they preferably satisfy the relation: $0.30 < T12/T23 < 2.0$.

The above relation facilitates the correction of the off-axis aberration of the photographing optical lens assembly.

In the aforementioned photographing optical lens assembly, the Abbe number of the second lens element is V2, and it preferably satisfies the relation: $V2 < 25$.

The above relation can effectively correct the chromatic aberration of the photographing optical lens assembly, thereby the resolution of the photographing optical lens assembly can be improved.

In the aforementioned photographing optical lens assembly, an object to be photographed is imaged on an electronic sensor. The total track length of the photographing optical lens assembly is TTL, which is defined as the on-axis spacing between the object-side surface of the first lens element and the image plane, the image height of the photographing optical lens assembly is ImgH, which is defined as half of the diagonal length of the effective pixel area of the electronic sensor, and they preferably satisfy the relation: $TTL/ImgH < 1.90$.

The above relation enables the photographing optical lens assembly to maintain a compact form.

According to another aspect of the present invention, in the present photographing optical lens assembly, when the first lens element is a bi-convex lens element, the Abbe number of the first lens element is V1, and it satisfies the relation: $V1 < 62$.

When V1 satisfies the above relation, the astigmatism of the photographing optical lens assembly may be more effectively corrected, improving the image quality of the photographing optical lens assembly.

Preferably in the aforementioned photographing optical lens assembly, the lens elements with refractive power are limited to the first lens element, the second lens element and the third lens element.

In the aforementioned photographing optical lens assembly, the focal length of the first lens element is f1, the focal length of the photographing optical lens assembly is f, and they preferably satisfy the relation: $1.30 < f/f1 < 2.00$.

When the above relation is satisfied, the refractive power of the first lens element is more balanced so that the total track length of the photographing optical lens assembly can be effectively controlled to maintain the compact form of the photographing optical lens assembly. The above relation also prevents the high order spherical aberration and coma from becoming too large, so that the image quality can be improved.

Further, it will be preferable that f/f1 satisfies the relation: 1.45<f/f1<1.70.

In the aforementioned photographing optical lens assembly, the focal length of the third lens element is f3, the focal length of the photographing optical lens assembly is f, and they preferably satisfy the relation: −0.70<f/f3<−0.45.

The above relation prevents the angle at which the light is projected onto the electronic sensor from becoming too large and enables the principal point of the photographing optical lens assembly to be positioned far away from the image plane, thereby the total track length of the photographing optical lens assembly can be reduced effectively.

In the aforementioned photographing optical lens assembly, the radius of curvature of the object-side surface of the first lens element is R1, the radius of curvature of the image-side surface of the first lens element is R2, and they preferably satisfy the relation: 0<|R1/R2|<0.25.

The above relation facilitates the correction of the spherical aberration of the photographing optical lens assembly.

In the aforementioned photographing optical lens assembly, the radius of curvature of the object-side surface of the third lens element is R5, the radius of curvature of the image-side surface of the third lens element is R6, and they preferably satisfy the relation: R5/R6<−1.5.

The above relation facilitates the correction of the astigmatism and distortion of the photographing optical lens assembly so that the image quality can be improved.

In the aforementioned photographing optical lens assembly, the Abbe number of the second lens element is V2, and it preferably satisfies the relation: V2<25.

The above relation facilitates the correction of the chromatic aberration of the photographing optical lens assembly so that the resolution of the photographing optical lens assembly can be improved.

In the aforementioned photographing optical lens assembly, an object to be photographed is imaged on an electronic sensor. The total track length of the photographing optical lens assembly is TTL, which is defined as the on-axis spacing between the object-side surface of the first lens element and the image plane, the image height of the photographing optical lens assembly is ImgH, which is defined as half of the diagonal length of the effective pixel area of the electronic sensor, and they preferably satisfy the relation: TTL/ImgH<1.90.

The above relation enables the photographing optical lens assembly to maintain a compact form.

According to another aspect of the present invention, in the present photographing optical lens assembly, when the first lens element is a meniscus lens element, the radius of curvature of the object-side surface of the first lens element is R1, the radius of curvature of the image-side surface of the first lens element is R2, and they satisfy the relation: 0<|R1/R2|<0.4.

The above relation facilitates the correction of the spherical aberration of the photographing optical lens assembly.

Preferably in the aforementioned photographing optical lens assembly, the lens elements with refractive power are limited to the first lens element, the second lens element and the third lens element.

In the aforementioned photographing optical lens assembly, the focal length of the first lens element is f1, the focal length of the photographing optical lens assembly is f, and they preferably satisfy the relation: 1.30<f/f1<2.00.

When the above relation is satisfied, the refractive power of the first lens element is more balanced so that the total track length of the photographing optical lens assembly can be effectively controlled to maintain the compact form of the photographing optical lens assembly. The above relation also prevents the high order spherical aberration and coma from becoming too large, so that the image quality may be improved.

Further, it will be preferable that f/f1 satisfies the relation: 1.45<f/f1<1.70.

In the aforementioned photographing optical lens assembly, the focal length of the third lens element is f3, the focal length of the photographing optical lens assembly is f, and they preferably satisfy the relation: −0.70<f/f3<−0.45.

The above relation prevents the angle at which the light is projected onto the electronic sensor from becoming too large and enables the principal point of the photographing optical lens assembly to be positioned far away from the image plane, thereby the total track length of the photographing optical lens assembly can be reduced effectively.

In the aforementioned photographing optical lens assembly, the Abbe number of the first lens element is V1, and it preferably satisfies the relation: V1<62.

When V1 satisfies the above relation, the astigmatism of the photographing optical lens assembly can be more effectively corrected, improving the image quality of the photographing optical lens assembly.

In the aforementioned photographing optical lens assembly, the Abbe number of the second lens element is V2, and it preferably satisfies the relation: V2<25.

The above relation can effectively correct the chromatic aberration of the photographing optical lens assembly so that the resolution of the photographing optical lens assembly can be improved.

In the aforementioned photographing optical lens assembly, the radius of curvature of the object-side surface of the third lens element is R5, the radius of curvature of the image-side surface of the third lens element is R6, and they preferably satisfy the relation: R5/R6<−1.5.

The above relation facilitates the correction of the astigmatism and distortion of the photographing optical lens assembly so that the image quality can be improved.

In the aforementioned photographing optical lens assembly, an object to be photographed is imaged on an electronic sensor. The total track length of the photographing optical lens assembly is TTL, which is defined as the on-axis spacing between the object-side surface of the first lens element and the image plane, the image height of the photographing optical lens assembly is ImgH, which is defined as half of the diagonal length of the effective pixel area of the electronic sensor, and they preferably satisfy the relation: TTL/ImgH<1.80.

The above relation enables the photographing optical lens assembly to maintain a compact form.

In the present photographing optical lens assembly, the first lens element provides a strong positive refractive power, and the aperture stop is located near the object side of the photographing optical lens assembly, thereby the exit pupil of the photographing optical lens assembly can be far away from the image plane. Therefore, the light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the inflection point formed on the third lens element can effectively reduce the angle at which the light is projected onto the sensor from the off-axis field of view.

In addition, for an optical system with a wide field of view, it requires special effort to correct the distortion and chromatic aberration of magnification, and this can be accomplished by placing the aperture stop in a location where the refractive power of the optical system is balanced. In the present photographing optical lens assembly, if the aperture stop is disposed in front of the first lens element, the telecentric feature is emphasized and results in a shorter total track length; if the aperture stop is disposed between the first lens element and the second lens element, the emphasis is on the wide field of view; additionally, such an aperture stop placement helps to effectively reduce the sensitivity of the optical system.

In the present photographing optical lens assembly, the lens elements can be made of glass or plastic material. If the lens elements are made of glass, there is more freedom in distributing the refractive power of the optical system. If plastic material is adopted to produce lens elements, the production cost will be reduced effectively. Additionally, the surfaces of the lens elements can be formed to be aspheric and made to be non-spherical easily, allowing more design parameter freedom which can be used to reduce aberrations and the number of the lens elements, so that the total track length of the photographing optical lens assembly may be shortened effectively.

Preferred embodiments of the present invention will be illustrated along with the accompanying drawings in the following paragraphs.

Figure 2:
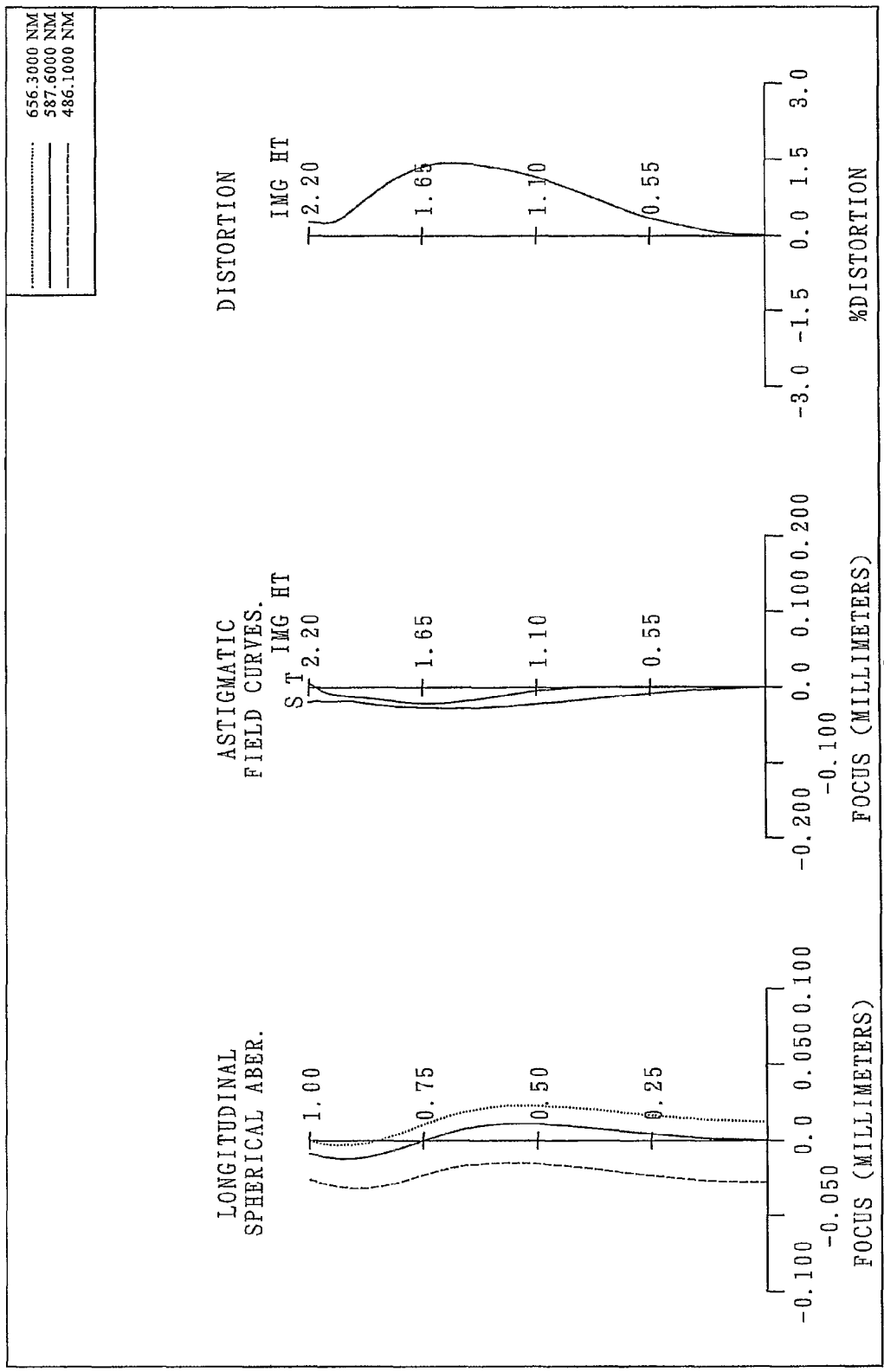
FIG. 2 shows the aberration curves of the first embodiment of the present invention.

FIG. 1 shows a photographing optical lens assembly in accordance with a first embodiment of the present invention, and FIG. 2 shows the aberration curves of the first embodiment of the present invention. The photographing optical lens assembly of the first embodiment of the present invention mainly comprises three lens elements with refractive power, including in order from the object side to the image side: a plastic first lens element 100 with positive refractive power having a convex object-side surface 101 and a convex image-side surface 102, the object-side and image-side surfaces 101 and 102 thereof being aspheric; a plastic second lens element 110 with negative refractive power having a concave object-side surface 111 and a convex image-side surface 112, the object-side and image-side surfaces 111 and 112 thereof being aspheric; a plastic third lens element 120 with negative refractive power having a concave object-side surface 121, a concave image-side surface 122 and at least one inflection point formed on the image-side surface 122, the object-side and image-side surfaces 121 and 122 thereof being aspheric; an aperture stop 130 located in front of the first lens element 100; an IR filter 140 located behind the third lens element 120, the IR filter 140 having no influence on the focal length of the photographing optical lens assembly; and an image plane 150 located behind the IR filter 140.

The equation of the aspheric surface profiles is expressed as follows:

$$X(Y) = (Y^2/R)/(1+sqrt(1-(1+k)*(Y/R)^2)) + \sum_i (Ai)*(Y^i)$$

wherein:
X: the height of a point on the aspheric surface at a distance Y from the optical axis relative to the tangential plane at the aspheric surface vertex;
Y: the distance from the point on the curve of the aspheric surface to the optical axis;
k: the conic coefficient;
Ai: the aspheric coefficient of order i.

In the first embodiment of the present photographing optical lens assembly, the focal length of the first lens element 100 is f1, the focal length of the second lens element 110 is f2, the focal length of the third lens element 120 is f3, the focal length of the photographing optical lens assembly is f, and they satisfy the relations: f/f1=1.60, f/f2=−0.40, f/f3=−0.53.

In the first embodiment of the present photographing optical lens assembly, the radius of curvature of the object-side surface 101 of the first lens element 100 is R1, the radius of curvature of the image-side surface 102 of the first lens element 100 is R2, the radius of curvature of the object-side surface 121 of the third lens element 120 is R5, the radius of curvature of the image-side surface 122 of the third lens element 120 is R6, and they satisfy the relations: |R1/R2|=0.04, R5/R6=−8.51.

In the first embodiment of the present photographing optical lens assembly, the on-axis thickness of the second lens element 110 is CT2, the on-axis thickness of the third lens element 120 is CT3, and they satisfy the relations: CT2=0.372 mm, CT2/f=0.10, CT3/f=0.29.

In the first embodiment of the present photographing optical lens assembly, the Abbe number of the first lens element 100 is V1, the Abbe number of the second lens element 110 is V2, and they satisfy the relations: V1=55.9, V2=23.4

In the first embodiment of the present photographing optical lens assembly, the on-axis spacing between the first lens element 100 and the second lens element 110 is T12, the on-axis spacing between the second lens element 110 and the third lens element 120 is T23, and they satisfy the relation: T12/T23=0.56.

In the first embodiment of the present photographing optical lens assembly, the total track length of the photographing optical lens assembly is TTL, the image height of the photographing optical lens assembly is ImgH, and they satisfy the relation: TTL/ImgH=1.78.

The detailed data of the structure of the first embodiment is shown in TABLE 1, and the aspheric surface data is shown in TABLE 2, wherein the units of the radius of curvature, the thickness and the focal length are expressed in mm, and HFOV is half of the maximal field of view.

Figure 3:
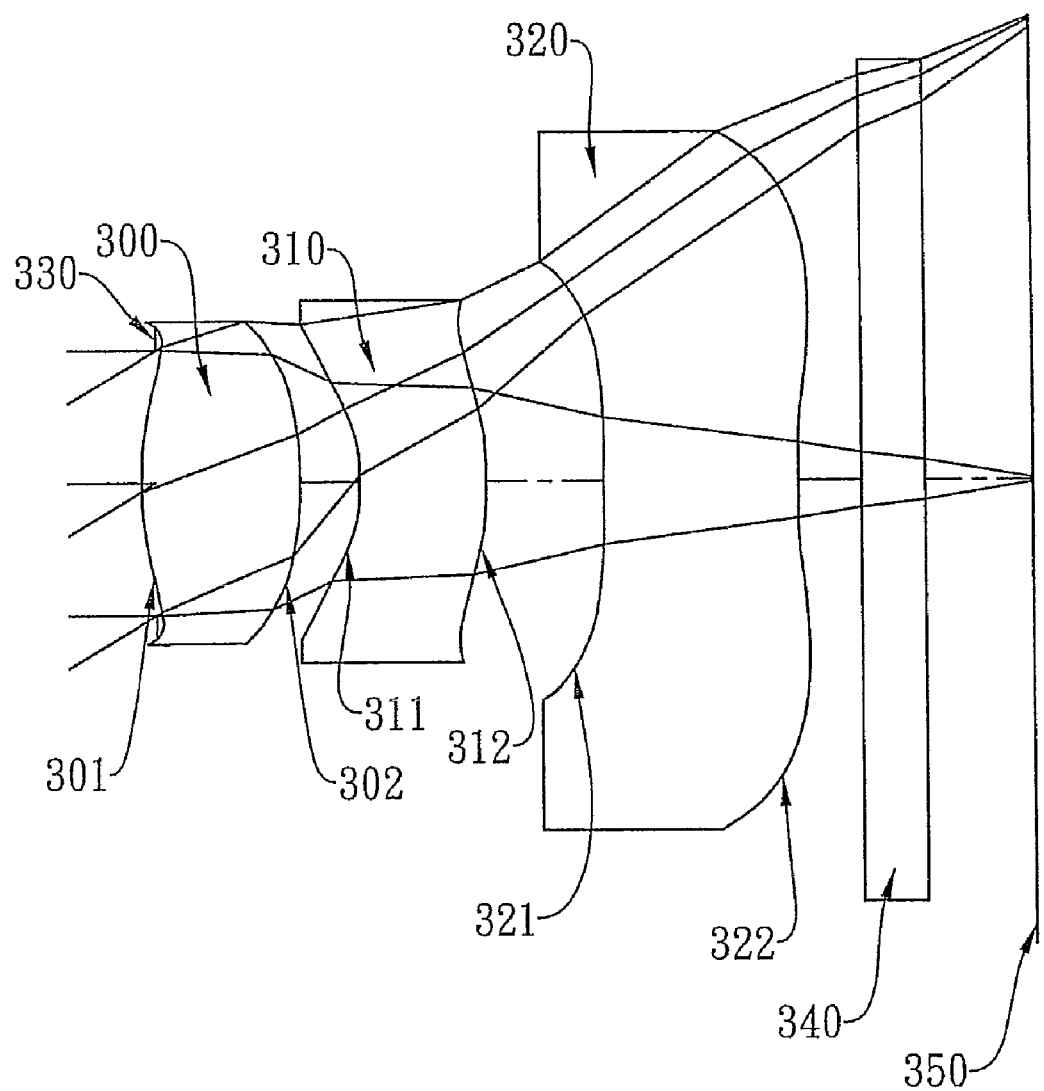
FIG. 3 shows a photographing optical lens assembly in accordance with a second embodiment of the present invention.
Figure 4:
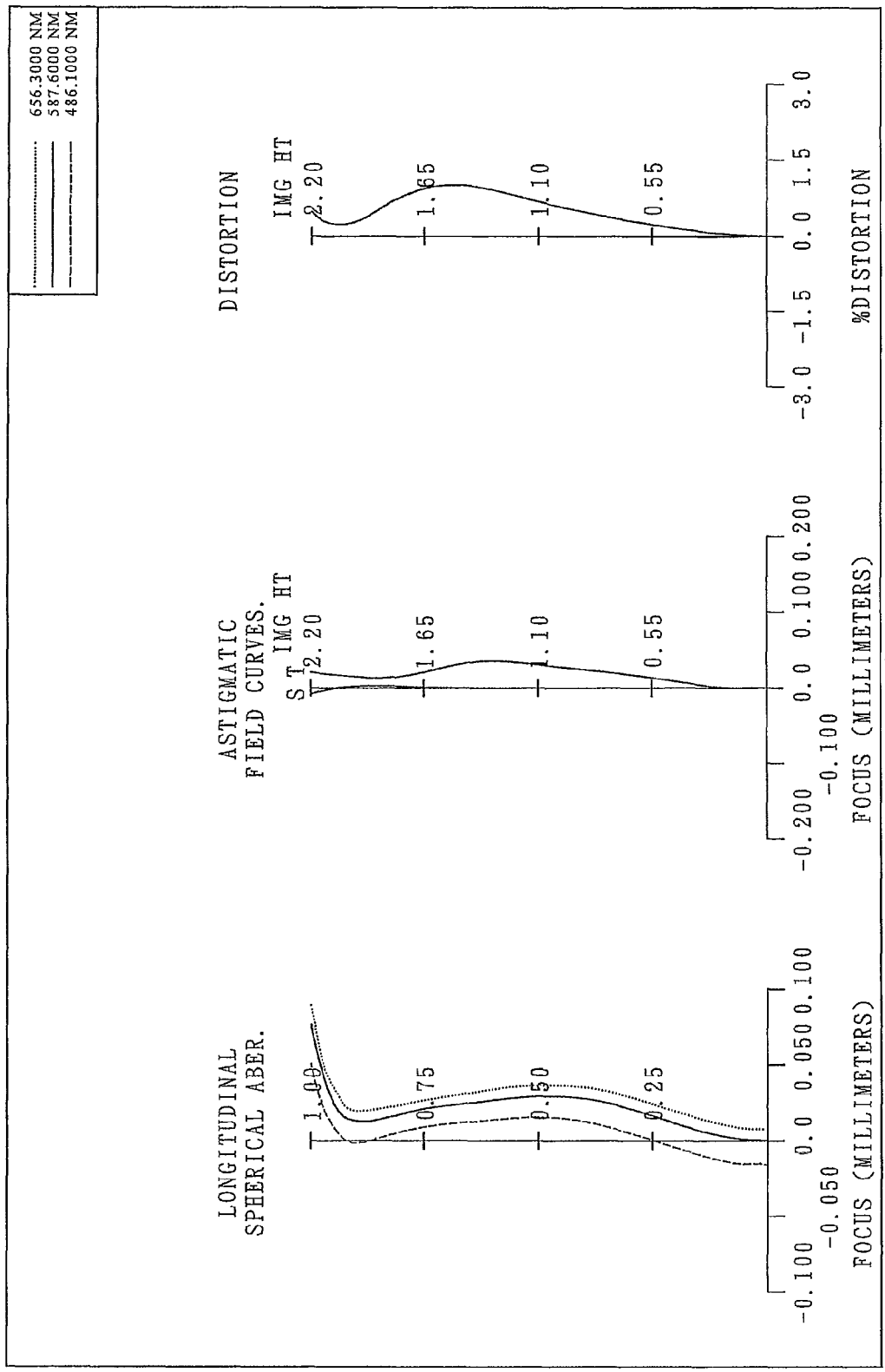
FIG. 4 shows the aberration curves of the second embodiment of the present invention.

FIG. 3 shows a photographing optical lens assembly in accordance with a second embodiment of the present invention, and FIG. 4 shows the aberration curves of the second embodiment of the present invention. The photographing optical lens assembly of the second embodiment of the present invention mainly comprises three lens elements with refractive power, including in order from the object side to the image side: a plastic first lens element 300 with positive refractive power having a convex object-side surface 301 and a convex image-side surface 302, the object-side and image-side surfaces 301 and 302 thereof being aspheric; a plastic second lens element 310 with negative refractive power having a concave object-side surface 311 and a convex image-side surface 312, the object-side and image-side surfaces 311 and 312 thereof being aspheric; a plastic third lens element 320 with negative refractive power having a concave object-side surface 321, a concave image-side surface 322 and at least one inflection point formed on the image-side surface 322, the object-side and image-side surfaces 321 and 322 thereof being aspheric; an aperture stop 330 located in front of the first lens element 300; an IR filter 340 located behind the third lens element 320, the IR filter 340 having no influence on the focal length of the photographing optical lens assembly; and an image plane 350 located behind the IR filter 340.

The equation of the aspheric surface profiles of the second embodiment has the same form as that of the first embodiment.

In the second embodiment of the present photographing optical lens assembly, the focal length of the first lens element 300 is f1, the focal length of the second lens element 310 is f2, the focal length of the third lens element 320 is f3, the focal length of the photographing optical lens assembly is f, and they satisfy the relations: f/f1=1.96, f/f2=−0.61, f/f3=−0.80.

In the second embodiment of the present photographing optical lens assembly, the radius of curvature of the object-side surface 301 of the first lens element 300 is R1, the radius of curvature of the image-side surface 302 of the first lens element 300 is R2, the radius of curvature of the object-side surface 321 of the third lens element 320 is R5, the radius of curvature of the image-side surface 322 of the third lens element 320 is R6, and they satisfy the relations: R1/R2=|0.72|, R5/R6=−6.94.

In the second embodiment of the present photographing optical lens assembly, the on-axis thickness of the second lens element 310 is CT2, the on-axis thickness of the third lens element 320 is CT3, and they satisfy the relations: CT2=0.599 m, CT2/f=0.16, CT3/f=0.25.

In the second embodiment of the present photographing optical lens assembly, the Abbe number of the first lens element 300 is V1, the Abbe number of the second lens element 310 is V2, and they satisfy the relations: V1=55.9, V2=23.4.

In the second embodiment of the present photographing optical lens assembly, the on-axis spacing between the first lens element 300 and the second lens element 310 is T12, the on-axis spacing between the second lens element 310 and the third lens element 320 is T23, and they satisfy the relation: T12/T23=0.50.

In the second embodiment of the present photographing optical lens assembly, the total track length of the photographing optical lens assembly is TTL, the image height of the photographing optical lens assembly is ImgH, and they satisfy the relation: TTL/ImgH=1.87.

The detailed data of the structure of the second embodiment is shown in TABLE 3, and the aspheric surface data is shown in TABLE 4, wherein the units of the radius of curvature, the thickness and the focal length are expressed in mm, and HFOV is half of the maximal field of view.

Figure 5:
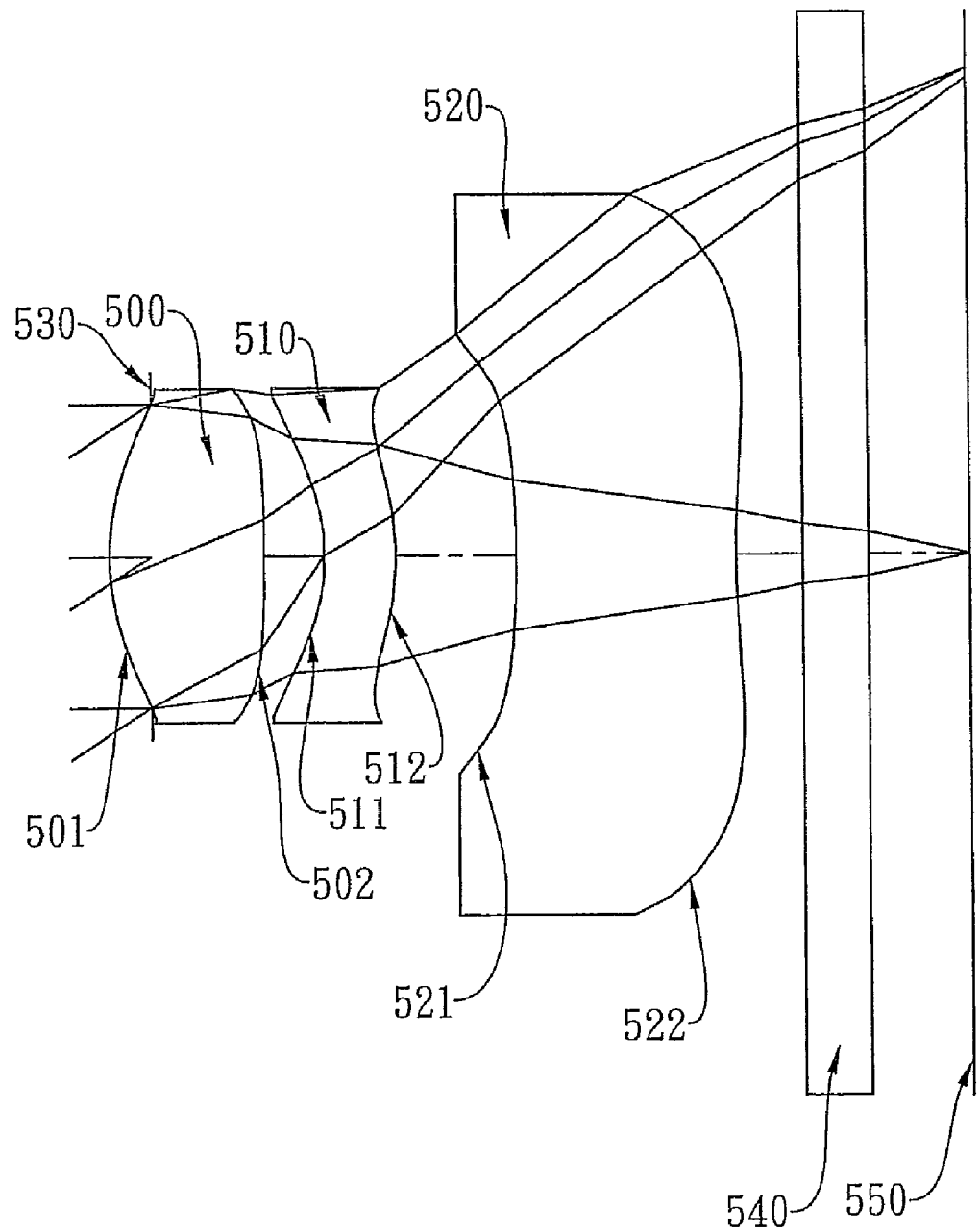
FIG. 5 shows a photographing optical lens assembly in accordance with a third embodiment of the present invention.
Figure 6:
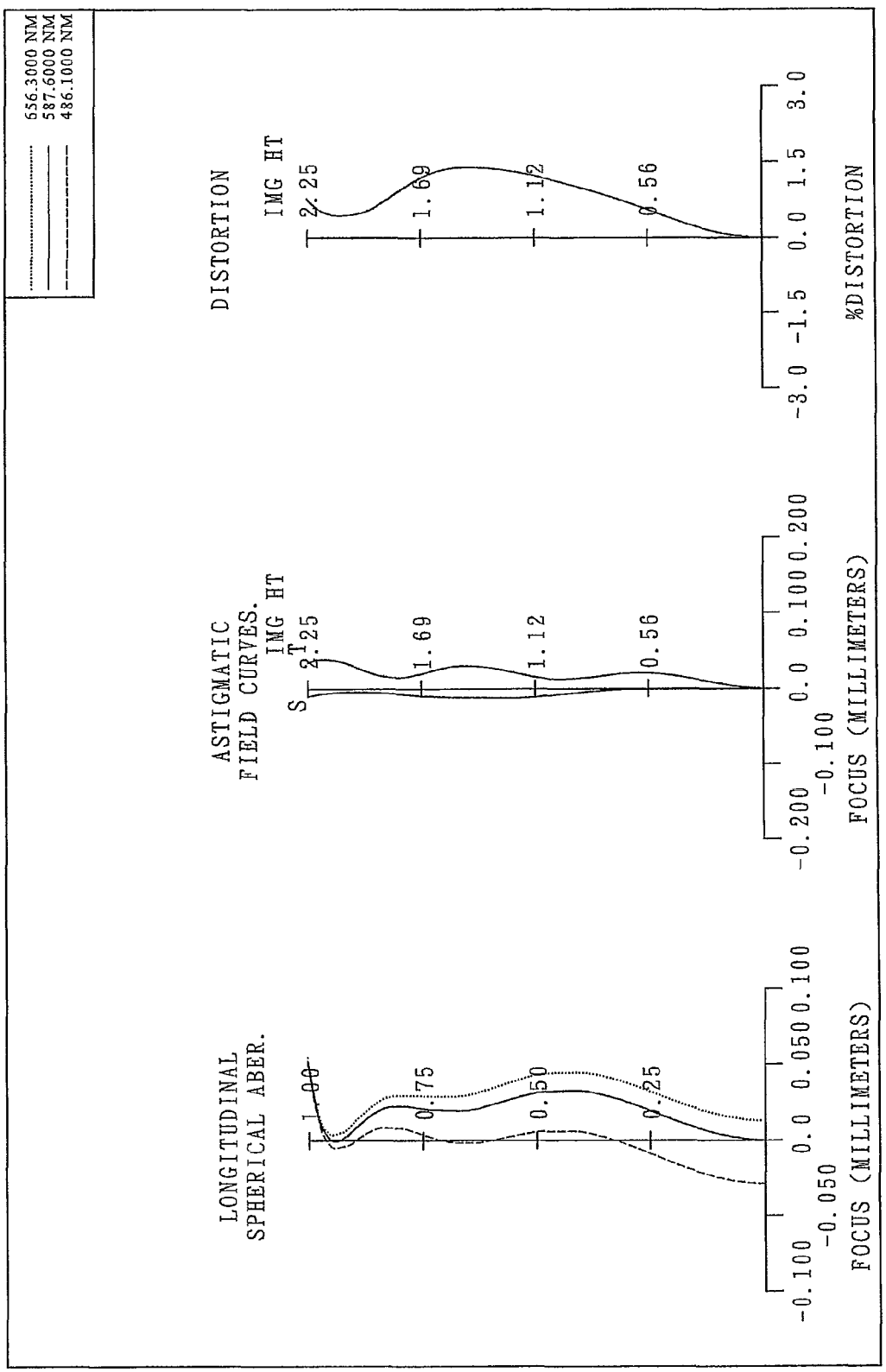
FIG. 6 shows the aberration curves of the third embodiment of the present invention.

FIG. 5 shows a photographing optical lens assembly in accordance with a third embodiment of the present invention, and FIG. 6 shows the aberration curves of the third embodiment of the present invention. The photographing optical lens assembly of the third embodiment of the present invention mainly comprises three lens elements with refractive power, including in order from the object side to the image side: a plastic first lens element 500 with positive refractive power having a convex object-side surface 501 and a convex image-side surface 502, the object-side and image-side surfaces 501 and 502 thereof being aspheric; a plastic second lens element 510 with negative refractive power having a concave object-side surface 511 and a convex image-side surface 512, the object-side and image-side surfaces 511 and 512 thereof being aspheric; a plastic third lens element 520 with negative refractive power having a concave object-side surface 521 and a concave image-side surface 522, the object-side and image-side surfaces 521 and 522 thereof being aspheric, and each of which being provided with at least one inflection point; an aperture stop 530 located in front of the first lens element 500; an IR filter 540 located behind the third lens element 520, the IR filter 540 having no influence on the focal length of the photographing optical lens assembly; and an image plane 550 located behind the IR filter 540.

The equation of the aspheric surface profiles of the third embodiment has the same form as that of the first embodiment.

In the third embodiment of the present photographing optical lens assembly, the focal length of the first lens element 500 is f1, the focal length of the second lens element 510 is f2, the focal length of the third lens element 520 is f3, the focal length of the photographing optical lens assembly is f, and they satisfy the relations: f/f1=1.59, f/f2=−0.33, f/f3=−0.64.

In the third embodiment of the present photographing optical lens assembly, the radius of curvature of the object-side surface 501 of the first lens element 500 is R1, the radius of curvature of the image-side surface 502 of the first lens element 500 is R2, the radius of curvature of the object-side surface 521 of the third lens element 520 is R5, the radius of curvature of the image-side surface 522 of the third lens element 520 is R6, and they satisfy the relations: |R1/R2|=0.07, R5/R6=−2.08.

In the third embodiment of the present photographing optical lens assembly, the on-axis thickness of the second lens element 510 is CT2, the on-axis thickness of the third lens element 520 is CT3, and they satisfy the relations: CT2=0.325 mm, CT2/f=0.09, CT3/f=0.29.

In the third embodiment of the present photographing optical lens assembly, the Abbe number of the first lens element 500 is V1, the Abbe number of the second lens element 510 is V2, and they satisfy the relations: V1=55.9, V2=23.4.

In the third embodiment of the present photographing optical lens assembly, the on-axis spacing between the first lens element 500 and the second lens element 510 is T12, the on-axis spacing between the second lens element 510 and the third lens element 520 is T23, and they satisfy the relation: T12/T23=0.50.

In the third embodiment of the present photographing optical lens assembly, the total track length of the photographing optical lens assembly is TTL, the image height of the photographing optical lens assembly is ImgH, and they satisfy the relation: TTL/ImgH=1.70.

The detailed data of the structure of the third embodiment is shown in TABLE 5, and the aspheric surface data is shown in TABLE 6A and TABLE 6B, wherein the units of the radius of curvature, the thickness and the focal length are expressed in mm, and HFOV is half of the maximal field of view.

Figure 7:
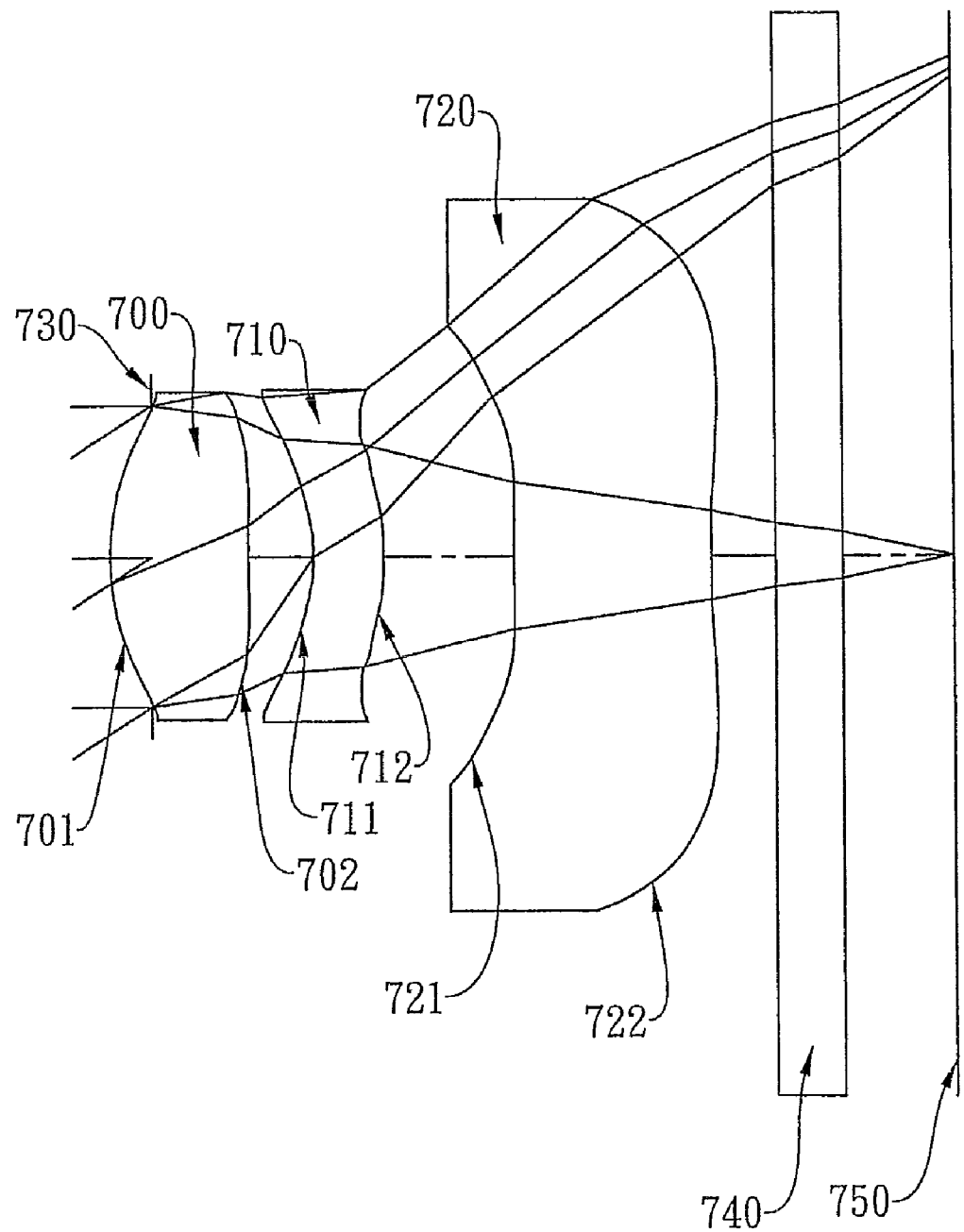
FIG. 7 shows a photographing optical lens assembly in accordance with a fourth embodiment of the present invention.
Figure 8:
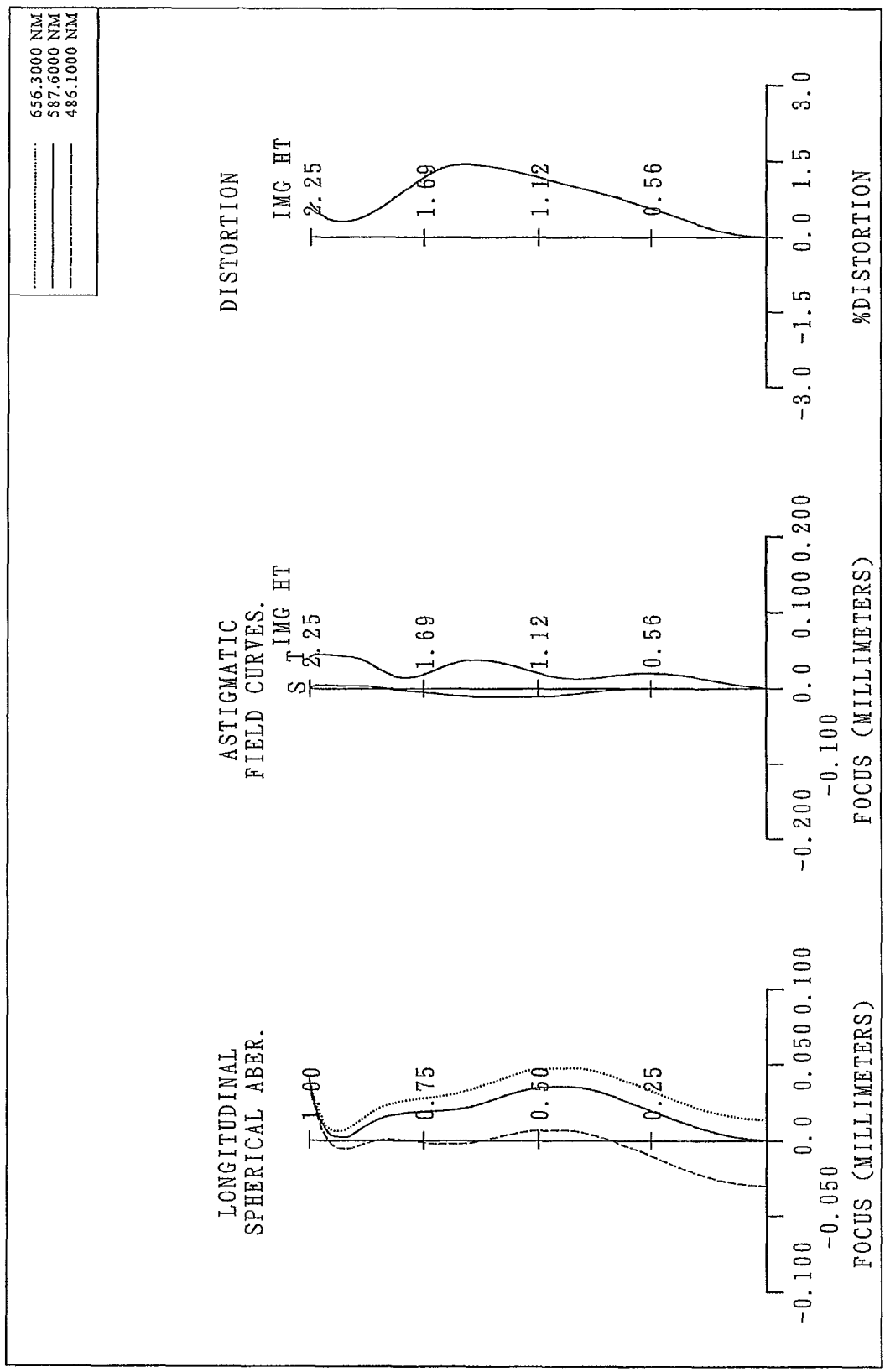
FIG. 8 shows the aberration curves of the fourth embodiment of the present invention.

FIG. 7 shows a photographing optical lens assembly in accordance with a fourth embodiment of the present invention, and FIG. 8 shows the aberration curves of the fourth embodiment of the present invention. The photographing optical lens assembly of the fourth embodiment of the present invention mainly comprises three lens elements with refractive power, including in order from the object side to the image side: a plastic first lens element 700 with positive refractive power having a convex object-side surface 701 and a concave image-side surface 702, the object-side and image-side surfaces 701 and 702 thereof being aspheric; a plastic second lens element 710 with negative refractive power having a concave object-side surface 711 and a convex image-side surface 712, the object-side and image-side surfaces 711 and 712 thereof being aspheric; a plastic third lens element 720 with negative refractive power having a concave object-side surface 721 and a concave image-side surface 722, the object-side and image-side surfaces 721 and 722 thereof being aspheric, and each of which being provided with at least one inflection point; an aperture stop 730 located in front of the first lens element 700; an IR filter 740 located behind the third lens element 720, the IR filter 740 having no influence on the focal length of the photographing optical lens assembly; and an image plane 750 located behind the IR filter 740.

The equation of the aspheric surface profiles of the fourth embodiment has the same form as that of the first embodiment.

In the fourth embodiment of the present photographing optical lens assembly, the focal length of the first lens element 700 is f1, the focal length of the second lens element 710 is f2, the focal length of the third lens element 720 is f3, the focal length of the photographing optical lens assembly is f, and they satisfy the relations: f/f1=1.52, f/f2=−0.28, f/f3=−0.57.

In the fourth embodiment of the present photographing optical lens assembly, the radius of curvature of the object-side surface 701 of the first lens element 700 is R1, the radius of curvature of the image-side surface 702 of the first lens element 700 is R2, the radius of curvature of the object-side surface 721 of the third lens element 720 is R5, the radius of curvature of the image-side surface 722 of the third lens element 720 is R6, and they satisfy the relations: |R1/R2|=0.02, R5/R6=−5.36.

In the fourth embodiment of the present photographing optical lens assembly, the on-axis thickness of the second lens element 710 is CT2, the on-axis thickness of the third lens element 720 is CT3, and they satisfy the relations: CT2=0.320 mm, CT2/f=0.09, CT3/f=0.26.

In the fourth embodiment of the present photographing optical lens assembly, the Abbe number of the first lens element 700 is V1, the Abbe number of the second lens element 710 is V2, and they satisfy the relations: V1=55.9, V2=23.4.

In the fourth embodiment of the present photographing optical lens assembly, the on-axis spacing between the first lens element 700 and the second lens element 710 is T12, the on-axis spacing between the second lens element 710 and the third lens element 720 is T23, and they satisfy the relation: T12/T23=0.50.

In the fourth embodiment of the present photographing optical lens assembly, the total track length of the photographing optical lens assembly is TTL, the image height of the photographing optical lens assembly is ImgH, and they satisfy the relation: TTL/ImgH=1.66.

The detailed data of the structure of the fourth embodiment is shown in TABLE 7, and the aspheric surface data is shown in TABLE 8A and TABLE 8B, wherein the units of the radius of curvature, the thickness and the focal length are expressed in mm, and HFOV is half of the maximal field of view.

It is to be noted that TABLES 1-8 show different data of the different embodiments, however, the data of the different embodiments are obtained from experiments. Therefore, any photographing optical lens assembly of the same structure is considered to be within the scope of the present invention even if it uses different data. TABLE 9 shows the data of the respective embodiments resulting from the equations.

The aforementioned structure and arrangement of optical elements can effectively correct the aberrations of the photographing optical lens assembly, improving image quality and enabling the photographing optical lens assembly to maintain a compact form.

What is claimed is:

1. A photographing optical lens assembly including, in order from an object side to an image side:
    a first lens element with positive refractive power having a convex object-side surface and a convex image-side surface;
    a second lens element with negative refractive power having a concave object-side surface and a convex image-side surface, the object-side and image-side surfaces thereof being aspheric; and
    a third lens element with negative refractive power and at least one inflection point formed thereon having a concave object-side surface and a concave image-side surface, the object-side and image-side surfaces thereof being aspheric;
    wherein an on-axis thickness of the second lens element is CT2, a focal length of the photographing optical lens assembly is f, and they satisfy the relation: 0.03<CT2/f<0.16.

2. The photographing optical lens assembly according to claim 1, wherein both of the second lens element and the third lens element are made of plastic material.

3. The photographing optical lens assembly according to claim 1, wherein the lens elements with refractive power are limited to the first lens element, the second lens element and the third lens element.

4. The photographing optical lens assembly according to claim 3, wherein an aperture stop is disposed in front of the first lens element.

5. The photographing optical lens assembly according to claim 4, wherein a focal length of the first lens element is f1, and it satisfies the relation: 1.30<f/f1<2.00.

6. The photographing optical lens assembly according to claim 5, wherein a focal length of the second lens element is f2, and it satisfies the relations: 1.45<f/f1<1.70, and −0.58<f/f2<−0.2.

7. The photographing optical lens assembly according to claim 4, wherein a radius of curvature of the object-side surface of the first lens element is R1, a radius of curvature of the image-side surface of the first lens element is R2, and they satisfy the relation: 0<|R1/R2|<0.25.

8. The photographing optical lens assembly according to claim 7, wherein a radius of curvature of the object-side surface of the third lens element is R5, a radius of curvature of the image-side surface of the third lens element is R6, and they satisfy the relation: R5/R6<−1.5.

9. The photographing optical lens assembly according to claim 4, wherein an on-axis thickness of the third lens element is CT3, and it satisfies the relation: 0.20<CT3/f<0.40.

10. The photographing optical lens assembly according to claim 9, wherein an on-axis spacing between the first lens element and the second lens element is T12, an on-axis spacing between the second lens element and the third lens element is T23, and they satisfy the relation: 0.3<T12/T23<2.0.

11. The photographing optical lens assembly according to claim 4, wherein an Abbe number of the second lens element is V2, and it satisfies the relation: V2<25.

12. The photographing optical lens assembly according to claim 3, wherein the on-axis thickness of the second lens element is CT2, and it satisfies the relation: 0.15 mm<CT2<0.38 mm.

13. The photographing optical lens assembly according to claim 3, wherein an object to be photographed is imaged on an electronic sensor; and wherein a total track length of the photographing optical lens assembly is TTL, an image height of the photographing optical lens assembly is ImgH, and they satisfy the relation: TTL/ImgH<1.90.

14. A photographing optical lens assembly including, in order from an object side to an image side:
    a first lens element with positive refractive power having a convex object-side surface and a convex image-side surface;
    a second lens element with negative refractive power having a concave object-side surface and a convex image-side surface, the object-side and image-side surfaces thereof being aspheric; and
    a third lens element with negative refractive power and at least one inflection point formed thereon having a concave object-side surface and a concave image-side surface, the object-side and image-side surfaces thereof being aspheric;

wherein an Abbe number of the first lens element is V1, and it satisfies the relation: V1<62.

15. The photographing optical lens assembly according to claim 14, wherein both of the second lens element and the third lens element are made of plastic material.

16. The photographing optical lens assembly according to claim 14, wherein the lens elements with refractive power are limited to the first lens element, the second lens element and the third lens element.

17. The photographing optical lens assembly according to claim 16, wherein an aperture stop is disposed in front of the first lens element.

18. The photographing optical lens assembly according to claim 17, wherein a focal length of the first lens element is f1, a focal length of the photographing optical lens assembly is f, and they satisfy the relation: 1.30<f/f1<2.00.

19. The photographing optical lens assembly according to claim 18, wherein a focal length of the third lens element is f3, and it satisfies the relation: 1.45<f/f1<1.70, and −0.70<f/f3<−0.45.

20. The photographing optical lens assembly according to claim 17, wherein a radius of curvature of the object-side surface of the first lens element is R1, a radius of curvature of the image-side surface of the first lens element is R2, and they satisfy the relation: 0<|R1/R2|<0.25.

21. The photographing optical lens assembly according to claim 20, wherein a radius of curvature of the object-side surface of the third lens element is R5, a radius of curvature of the image-side surface of the third lens element is R6, and they satisfy the relation: R5/R6<−1.5.

22. The photographing optical lens assembly according to claim 16, wherein an Abbe number of the second lens element is V2, and it satisfies the relation: V2<25.

23. The photographing optical lens assembly according to claim 16, wherein an object to be photographed is imaged on an electronic sensor; and wherein a total track length of the photographing optical lens assembly is TTL, an image height of the photographing optical lens assembly is ImgH, and they satisfy the relation: TTL/ImgH<1.90.

24. A photographing optical lens assembly including, in order from an object side to an image side:
   a first lens element with positive refractive power having a convex object-side surface and a concave image-side surface, the object-side and image-side surfaces thereof being aspheric;
   a second lens element with negative refractive power having a concave object-side surface and a convex image-side surface, the object-side and image-side surfaces thereof being aspheric; and
   a third lens element with negative refractive power and at least one inflection point formed thereon having a concave object-side surface and a concave image-side surface, the object-side and image-side surfaces thereof being aspheric;
   wherein a radius of curvature of the object-side surface of the first lens element is R1, a radius of curvature of the image-side surface of the first lens element is R2, and they satisfy the relation: 0<|R1/R2|<0.4.

25. The photographing optical lens assembly according to claim 24, wherein both of the second lens element and the third lens element are made of plastic material.

26. The photographing optical lens assembly according to claim 24, wherein the lens elements with refractive power are limited to the first lens element, the second lens element and the third lens element.

27. The photographing optical lens assembly according to claim 26, wherein a focal length of the first lens element is f1, a focal length of the photographing optical lens assembly is f, and they satisfy the relation: 1.30<f/f1<2.00.

28. The photographing optical lens assembly according to claim 27, wherein a focal length of the third lens element is f3, and it satisfies the relations: 1.45<f/f1<1.70, and −0.70<f/f3<−0.45.

29. The photographing optical lens assembly according to claim 26, wherein an Abbe number of the first lens element is V1, and it satisfies the relation: V1<62.

30. The photographing optical lens assembly according to claim 29, wherein an Abbe number of the second lens element is V2, a radius of curvature of the object-side surface of the third lens element is R5, a radius of curvature of the image-side surface of the third lens element is R6, and they satisfy the relations: V2<25, and R5/R6<−1.5.

31. The photographing optical lens assembly according to claim 26, wherein an object to be photographed is imaged on an electronic sensor; and wherein a total track length of the photographing optical lens assembly is TTL, an image height of the photographing optical lens assembly is ImgH, and they satisfy the relation: TTL/ImgH<1.80.

* * * * *